(12) United States Patent
Browning

(10) Patent No.: US 9,561,454 B2
(45) Date of Patent: Feb. 7, 2017

(54) DEBRIS FILTER WITH SPLITTER BAR

(71) Applicant: OVIVO LUXEMBOURG S.a.r.L., Munsbach (LU)

(72) Inventor: Andrew L. Browning, South Jordan, UT (US)

(73) Assignee: OVIVO INC., Montreal (CA)

(*) Notice: Subject to any disclaimer, the term of this patent is extended or adjusted under 35 U.S.C. 154(b) by 1042 days.

(21) Appl. No.: 13/647,882

(22) Filed: Oct. 9, 2012

(65) Prior Publication Data
US 2014/0097145 A1 Apr. 10, 2014

(51) Int. Cl.
*B01D 29/03* (2006.01)
*B01D 29/68* (2006.01)

(52) U.S. Cl.
CPC .......... *B01D 29/035* (2013.01); *B01D 29/682* (2013.01); *B01D 29/688* (2013.01); *B01D 2201/082* (2013.01)

(58) Field of Classification Search
None
See application file for complete search history.

(56) References Cited

U.S. PATENT DOCUMENTS

| | | | |
|---|---|---|---|
| 1,585,817 A | 5/1926 | Bailey et al. | |
| 1,977,601 A * | 10/1934 | Winton | B01D 29/0081 210/411 |
| 1,995,648 A * | 3/1935 | Rathbun | B01D 46/0065 210/411 |
| 1,995,649 A * | 3/1935 | Rathbun | B01D 46/0065 55/294 |
| 2,066,479 A * | 1/1937 | Macisaac | B01D 29/01 210/193 |
| 2,275,958 A * | 3/1942 | Hagel | B01D 35/02 210/108 |
| 2,310,587 A | 2/1943 | MacGill | |
| 2,835,390 A * | 5/1958 | King | B01D 29/25 210/411 |
| 3,017,029 A * | 1/1962 | Berninger | B01D 35/10 210/108 |
| 3,074,556 A * | 1/1963 | Rosaen | B01D 33/11 210/195.1 |
| 3,074,560 A * | 1/1963 | Kinney | B01D 33/11 210/330 |
| 3,155,473 A * | 11/1964 | McNeil | B60K 11/04 55/294 |

(Continued)

OTHER PUBLICATIONS

Brochure: Debris Filters, Beaudrey, www.Beaudrey.com.

*Primary Examiner* — Robert James Popovics
(74) *Attorney, Agent, or Firm* — R. Neil Sudol; Henry D. Coleman

(57) ABSTRACT

A debris filter has a housing, a filter screen mounted to the housing and disposed so as to extend across a flow path through the housing, a debris extractor mounted to the housing, and a splitter bar also mounted to the housing. The debris extractor and the filter screen are so mounted to the housing as to enable rotation of the filter screen and the debris extractor relative to one another. The debris extractor has a debris intake opening and the debris extractor and the splitter bar are so mounted to the housing that the intake opening is positionable adjacent to or in juxtaposition with the splitter bar with the splitter bar overlapping and shielding the intake opening.

18 Claims, 4 Drawing Sheets

(56) References Cited

U.S. PATENT DOCUMENTS

| | | | | |
|---|---|---|---|---|
| 3,168,467 A | * | 2/1965 | Dreyer | B01D 29/23 210/108 |
| 3,256,995 A | | 6/1966 | Schmid et al. | |
| 3,345,805 A | * | 10/1967 | Sherrill | B01D 46/26 55/283 |
| 3,357,566 A | * | 12/1967 | Schmid | B01D 29/118 210/333.01 |
| 3,377,780 A | * | 4/1968 | Noland | B01D 46/0065 55/294 |
| 3,483,675 A | * | 12/1969 | King, Jr. | B01D 46/26 15/352 |
| 3,511,374 A | * | 5/1970 | Beal | B01D 29/15 209/258 |
| 3,574,509 A | * | 4/1971 | Zentis | B01D 29/23 210/107 |
| 3,635,348 A | * | 1/1972 | Carr | B01D 29/35 210/333.1 |
| 3,734,299 A | * | 5/1973 | Akiyama | B01D 29/15 210/333.1 |
| 3,757,496 A | * | 9/1973 | Berg | B01D 46/0013 55/293 |
| 3,784,016 A | * | 1/1974 | Akiyama | B01D 29/114 210/333.1 |
| 3,823,831 A | * | 7/1974 | LeBlanc, Jr. | B01D 35/02 210/408 |
| 3,837,149 A | * | 9/1974 | West | F01P 11/12 180/68.1 |
| 3,887,344 A | * | 6/1975 | Smith | B01D 46/0065 285/405 |
| 3,958,296 A | * | 5/1976 | Fell | B08B 5/02 15/304 |
| 4,085,051 A | * | 4/1978 | Kaminsky | B01D 29/018 210/333.01 |
| 4,096,032 A | * | 6/1978 | Mayers | G21C 3/3206 376/260 |
| 4,130,478 A | * | 12/1978 | Swallow | B01D 29/25 209/254 |
| 4,162,219 A | * | 7/1979 | Miropolsky | B01D 29/055 210/108 |
| 4,251,237 A | * | 2/1981 | Smith | B01D 46/0065 55/294 |
| 4,266,953 A | * | 5/1981 | Matthys | B01D 46/0068 55/283 |
| 4,297,209 A | * | 10/1981 | DeVisser | B01D 29/17 210/107 |
| 4,328,103 A | * | 5/1982 | Kraeling, Jr. | B01D 29/232 210/411 |
| 4,446,099 A | * | 5/1984 | Schwind | G21C 7/117 210/232 |
| 4,532,036 A | * | 7/1985 | Clifford | B01D 29/23 210/167.01 |
| 4,582,603 A | | 4/1986 | Nasse | |
| 4,643,828 A | * | 2/1987 | Barzuza | B01D 29/23 210/411 |
| 4,692,247 A | * | 9/1987 | Orlans | B01D 29/117 210/314 |
| 4,702,847 A | * | 10/1987 | Fux | B01D 21/0012 210/411 |
| 4,780,151 A | * | 10/1988 | Barzuza | B01D 29/031 134/21 |
| 4,810,270 A | * | 3/1989 | Terry | B01D 46/0046 209/274 |
| 4,818,402 A | * | 4/1989 | Steiner | B01D 29/23 210/411 |
| 4,826,512 A | * | 5/1989 | Fuller | B01D 46/0004 55/283 |
| 4,849,105 A | * | 7/1989 | Borchert | B01D 29/33 209/250 |
| 4,859,335 A | * | 8/1989 | Whyte | B01D 29/114 210/333.1 |
| 4,867,879 A | | 9/1989 | Müller | |
| 4,875,913 A | * | 10/1989 | Barzuza | B01D 29/031 210/106 |
| 4,898,671 A | * | 2/1990 | Fux | B01D 21/0012 210/333.01 |
| 4,904,397 A | | 2/1990 | Eimer et al. | |
| 5,128,029 A | * | 7/1992 | Herrmann | B01D 29/05 210/107 |
| 5,152,891 A | * | 10/1992 | Netkowicz | B01D 29/23 209/250 |
| 5,164,079 A | * | 11/1992 | Klein | B01D 29/117 210/186 |
| 5,183,568 A | * | 2/1993 | Lescovich | B01D 29/118 209/303 |
| 5,192,429 A | * | 3/1993 | Bader | B01D 29/15 210/170.09 |
| 5,243,632 A | * | 9/1993 | Badin | G21C 3/3206 210/451 |
| 5,268,095 A | * | 12/1993 | Barzuza | B01D 29/01 210/143 |
| 5,275,728 A | | 1/1994 | Koller | |
| 5,300,225 A | * | 4/1994 | Fischer | B01D 33/073 210/391 |
| 5,364,539 A | * | 11/1994 | Castagno | B01D 29/05 100/116 |
| 5,390,221 A | * | 2/1995 | Dix | G21C 3/3206 376/310 |
| 5,401,396 A | * | 3/1995 | Lescovich | B01D 29/118 209/273 |
| 5,464,542 A | * | 11/1995 | Grienberger | B01D 29/15 210/393 |
| 5,483,564 A | * | 1/1996 | Matzner | G21C 3/3206 376/310 |
| 5,549,825 A | * | 8/1996 | Barzuza | B01D 29/232 210/411 |
| 5,587,074 A | * | 12/1996 | Lynch | B01D 29/23 210/411 |
| 5,632,903 A | * | 5/1997 | Caracciolo, Jr. | B01D 29/117 210/333.01 |
| 5,674,392 A | * | 10/1997 | Christophe | B01D 29/23 210/259 |
| 5,688,402 A | * | 11/1997 | Green | B01D 29/036 210/355 |
| 5,728,297 A | | 3/1998 | Koller | |
| 5,735,337 A | * | 4/1998 | Edwards | A01G 3/08 165/119 |
| 5,748,694 A | * | 5/1998 | King | G21C 3/3206 210/131 |
| 5,759,398 A | * | 6/1998 | Kielbowicz | B01D 25/02 210/416.1 |
| 5,804,072 A | * | 9/1998 | Yang | B01D 29/117 210/106 |
| 5,824,229 A | * | 10/1998 | Larkey | B01D 29/117 210/108 |
| 5,835,549 A | * | 11/1998 | Sibiga | B01D 29/333 210/483 |
| 5,843,314 A | * | 12/1998 | Dwyer | G21C 19/307 210/315 |
| 5,855,794 A | * | 1/1999 | Caracciolo, Jr. | B01D 29/117 210/107 |
| 5,855,799 A | * | 1/1999 | Herrmann | B01D 17/045 210/330 |
| 5,935,439 A | * | 8/1999 | Hart | B01D 29/33 210/346 |
| 5,958,234 A | * | 9/1999 | Dwyer | G21C 19/307 210/315 |
| 6,103,132 A | * | 8/2000 | Seyfried | B01D 33/073 210/331 |
| 6,267,879 B1 | * | 7/2001 | Gil | B01D 29/114 210/107 |
| 6,337,013 B1 | * | 1/2002 | Koopmans | B01D 29/23 210/232 |
| 6,360,896 B1 | | 3/2002 | Schidmann | |
| 6,491,818 B2 | * | 12/2002 | Dwyer | G21C 19/307 210/315 |
| 6,497,815 B1 | | 12/2002 | Koller | |

(56) References Cited

U.S. PATENT DOCUMENTS

| | | | | |
|---|---|---|---|---|
| 6,543,624 B1* | 4/2003 | Geisbauer | B01D 29/15 | 210/333.1 |
| 6,572,763 B2* | 6/2003 | Gorshing | B01D 29/115 | 210/159 |
| 6,861,004 B2* | 3/2005 | Benenson, Jr. | B01D 29/15 | 210/785 |
| 6,959,818 B2* | 11/2005 | Olson | B01D 29/117 | 210/107 |
| 7,055,699 B2* | 6/2006 | Takatsuka | B01D 29/15 | 210/107 |
| 7,097,046 B2* | 8/2006 | Calabrese | B01D 29/01 | 210/123 |
| 7,211,190 B2* | 5/2007 | Kielbowicz | B01D 29/031 | 210/232 |
| 7,258,238 B2 | 8/2007 | Raghupathy et al. | | |
| 7,267,763 B2* | 9/2007 | Jackson | B01D 29/41 | 210/158 |
| 7,294,257 B2* | 11/2007 | Jackson | A01K 63/045 | 119/259 |
| 7,297,265 B1* | 11/2007 | Booth | B01D 29/23 | 210/304 |
| 7,946,367 B2* | 5/2011 | Good | B01D 46/0056 | 180/68.1 |
| 7,998,245 B2* | 8/2011 | Demonie | B01D 46/0056 | 460/102 |
| 8,028,841 B2* | 10/2011 | Olson | B01D 29/117 | 210/355 |
| 8,048,319 B2* | 11/2011 | Smith | B01D 29/15 | 210/167.01 |
| 8,054,932 B2* | 11/2011 | Smith | B01D 35/02 | 210/167.01 |
| 8,097,050 B2* | 1/2012 | Johnson | B01D 46/0065 | 460/102 |
| 8,123,047 B2 | 2/2012 | Keller et al. | | |
| 8,475,659 B2* | 7/2013 | Oh | B01D 29/012 | 210/167.01 |
| 8,496,117 B2* | 7/2013 | Leath, III | B01D 33/11 | 210/360.1 |
| 8,524,075 B1* | 9/2013 | Quintel | B01D 29/232 | 210/108 |
| 8,663,469 B2* | 3/2014 | Kim | B01D 29/031 | 210/167.01 |
| 8,678,199 B2* | 3/2014 | Keller | B01D 29/15 | 210/170.09 |
| 8,771,509 B2* | 7/2014 | Huang | C02F 11/00 | 210/237 |
| 8,821,720 B2* | 9/2014 | Lee | B01D 29/117 | 210/107 |
| 8,852,445 B2* | 10/2014 | Xia | B01D 29/39 | 210/333.01 |
| 8,877,054 B2* | 11/2014 | Andersen | 210/232 | |
| 8,945,379 B2* | 2/2015 | Brull | B01D 29/009 | 210/167.12 |
| 9,061,226 B2* | 6/2015 | Love | B01D 33/073 | |
| 9,211,489 B2* | 12/2015 | Riggers | B01D 29/6476 | |
| 9,233,324 B2* | 1/2016 | Kielbowicz | B01D 35/147 | |
| 9,266,045 B2* | 2/2016 | Kielbowicz | B01D 35/147 | |
| 9,327,218 B2* | 5/2016 | Linster | B01D 29/52 | |
| 9,415,332 B2* | 8/2016 | Shaw | B01D 29/64 | |
| 2004/0094470 A1* | 5/2004 | Jackson | A01K 63/045 | 210/411 |
| 2004/0112846 A1* | 6/2004 | Jackson | A01K 63/045 | 210/798 |
| 2004/0238435 A1* | 12/2004 | Olson | B01D 29/117 | 210/413 |
| 2005/0167355 A1* | 8/2005 | Kielbowicz | B01D 29/031 | 210/416.1 |
| 2006/0219645 A1* | 10/2006 | Bilanin | B01D 29/01 | 210/791 |
| 2007/0199885 A1* | 8/2007 | Shmuel | B01D 29/114 | 210/427 |
| 2008/0047885 A1* | 2/2008 | Shiekelmacher | B01D 29/23 | 210/107 |
| 2008/0272058 A1* | 11/2008 | Olson | B01D 29/117 | 210/741 |
| 2009/0050582 A1* | 2/2009 | Gil | B01D 29/114 | 210/798 |
| 2011/0303591 A1* | 12/2011 | Lee | B01D 29/117 | 210/106 |
| 2013/0026111 A1* | 1/2013 | Gil | B01D 29/114 | 210/791 |
| 2013/0087495 A1* | 4/2013 | Riggers | B01D 29/6476 | 210/415 |
| 2013/0270163 A1* | 10/2013 | Zur | B01D 29/117 | 210/138 |
| 2014/0021125 A1* | 1/2014 | Luo | B01D 29/33 | 210/332 |
| 2014/0021126 A1* | 1/2014 | Luo | B01D 29/23 | 210/333.01 |
| 2014/0097145 A1* | 4/2014 | Browning | B01D 29/035 | 210/780 |
| 2014/0116965 A1* | 5/2014 | Cote | B01D 33/11 | 210/784 |
| 2014/0305862 A1* | 10/2014 | Zur | B01D 33/37 | 210/333.01 |
| 2014/0366493 A1* | 12/2014 | Takahashi | B01D 29/117 | 55/302 |
| 2016/0067636 A1* | 3/2016 | Lee | B63J 4/002 | 210/741 |
| 2016/0096124 A1* | 4/2016 | Marco | B01D 29/23 | 210/170.01 |
| 2016/0097247 A1* | 4/2016 | Marco | B01D 29/62 | 166/308.1 |

* cited by examiner

DEBRIS FILTER WITH SPLITTER BAR

FIELD OF INVENTION

This invention relates to a debris filter with rotatable debris extractor. In addition, this invention provides a system and a method of operating a debris filter.

BACKGROUND OF THE INVENTION

Thermal and nuclear power plants use steam condensers for condensation of steam after the energy has been utilized to drive the turbine(s). The steam condensers may be water-cooled or air-cooled. In water-cooled process, water is typically obtained from sources like sea, rivers and lakes. The quantity of water required is quite large and it contains debris like grass, shells, fish, cloth and plastic sheet material. Such debris tends to clog the tubes of the steam condensers, causing reduction in heat transfer, which in turn may affect power generation. The problem of accumulation of debris and the need for periodic removal of debris poses a serious challenge to the power generating plants. To overcome this problem, an automatic debris filter is installed at the inlet of the condenser, which filters and removes suspended particles. Conventional automatic debris filters use different techniques for removing debris. In one such conventional debris filter, a tubular housing and a screen basket are provided, the screen basket being fastened to an inner periphery of housing. In the general arrangement of the debris filter, a debris extraction arm is mounted on the inlet side of the basket and is rotatable with respect to the screen and on its complete surface area.

For dislodging and removing debris clogged on the screen suction arms, which completely closes a segment of the screen and is rotatable to cover the complete screen, another method was adopted in the prior art is to use a debris filter with a rotatable suction arm inside the basket arm along with a jet water spray arrangement positioned outside the screen. In this debris filter the profile of the debris extractor does not facilitate removal of sticky debris from the screen easily. Hence, an additional water spray pump which delivers water at a velocity more than the inlet velocity of water from the clean side of filter is required to reverse the sticky debris from the screen. This arrangement results in additional power consumption for the water spray pump and also makes it more expensive.

OBJECTS OF THE INVENTION

An object of the invention is to provide an improved debris filter with a rotatable debris extractor.

A further object of the present invention is to provide a debris filter that is more efficient than conventional filters and occupies less space for the same throughput.

Another object of the present invention is to provide a debris filter that is less expensive than conventional debris filters.

These and other objects of the invention will be apparent from the drawings and descriptions herein. Although each of the objects of the invention is believed to be attained in at least one embodiment of the invention, there is not necessarily any one embodiment that achieves all of the objects of the invention.

SUMMARY OF THE INVENTION

A debris filter in accordance with the present invention comprises (a) a housing, casing or shell, (b) a filter screen mounted to the housing and disposed so as to extend across a flow path through the housing, (c) a debris extractor mounted to the housing, and (d) a splitter bar also mounted to the housing. The debris extractor and the filter screen are so mounted to the housing as to enable rotation of the filter screen and the debris extractor relative to one another. The debris extractor has a debris intake opening and the debris extractor and the splitter bar are so mounted to the housing that the intake opening is positionable adjacent to or in juxtaposition with the splitter bar with the splitter bar overlapping and shielding the intake opening.

It is contemplated that the filter screen is spherical, the intake opening extends along a cylindrical or circular periphery of the debris extractor, and the splitter bar has a cylindrical or circular inner periphery juxtaposable to the intake opening.

Pursuant to another feature of the present invention, the splitter bar extends across the flow path through the housing, upstream of the filter screen.

The splitter bar preferably has a tapered or wedge-shaped form. In that case, the splitter bar may have a chevron-shaped cross-section. More specifically, the splitter bar may include a pair of legs or panels in the form of webs that are connected to one another along an apical edge and that diverge from one another away from that apical edge. In addition, the webs have respective inner edges opposite the apical edge, the respective edges defining the cylindrical or circular inner periphery of the splitter bar.

Pursuant to further features of the present invention, the filter screen is mounted to the housing via a connector ring fixed to an inner surface of the housing, while the debris extractor is mounted to the housing for rotation about an axis oriented transversely to the path of fluid flow through the housing. Also, in a preferred embodiment the filter screen and the splitter bar are fixed relative to the housing, while the debris extractor is mounted to the housing upstream of an annular upstream edge of the filter screen.

Where the filter screen defines a filter zone, the debris extractor is positionable upstream of the filter screen and outside of the filter zone when the intake opening is disposed in juxtaposition with or adjacent to the splitter bar.

The debris extractor preferably includes a plurality of wiper blades disposed alongside the intake opening. The splitter bar is so mounted to the housing that the intake opening is positionable adjacent the splitter bar with the splitter bar overlapping and shielding the wiper blades.

In accordance with another feature of the present invention, the filter screen is provided with a plurality of ribs. The preferably take the form of elongate webs extending as annular sections disposed in mutually parallel planes on an inner or upstream side of the filter screen.

Where the filter screen is concave and defines a filter zone on an upstream side, the filter zone being bounded by a plane on an upstream side, the debris extractor has a rest position on a side of the plane opposite the filter screen, so that in the rest position the debris extractor is disposed outside of the filter zone.

Pursuant to an additional feature of the present invention, the splitter bar has a degree of sharpness selected in accordance with a rate of flow through the debris filter, to reduce turbulence around the debris intake opening of the debris extractor and concomitantly to reduce turbulence entering the filter zone.

The present invention is also directed to a method for operating a debris filter that includes a filter screen defining a filter zone, the filter zone being bounded on a downstream side by the filter screen and on an upstream side by a plane passing through an upstream edge of the filter screen. The method comprises (i) during normal operation of the debris filter, guiding a fluid stream along a flow path through the filter screen, (ii) during such normal operation, disposing a debris extractor in a rest position on an upstream side of the filter screen and outside of the filter zone, (iii) during a cleaning operation, moving the debris extractor from the rest position to a work position inside the filter zone, and (iv) subsequently during the cleaning operation, operating the debris extractor to remove debris from inside the filter zone.

Where the debris filter is provided with a splitter bar mounted to a housing of the debris extractor, disposed upstream of the filter zone and extending across the flow path, the disposing of the debris extractor in the rest position includes juxtaposing a debris intake opening of the debris extractor to the splitter bar so that the splitter bar shields the intake opening.

Where the debris extractor is rotatably mounted to the housing, the moving of the debris extractor includes rotating the debris extractor about an axis located upstream of the filter zone and oriented transversely to the flow path.

In a debris filter in accordance with the present invention, the spherical filter screen and the parking of the debris extractor outside of the filter zone increases the open area of the filter and allows for a freer flow of water through the system than in conventional debris filters. The increase in open area allows for a smaller shell diameter for a given flow rate. This enables a reduction in equipment cost. Alternatively, a higher flow rate may be supported with the same shell diameter as in conventional debris filters.

The splitter bar of the present invention protectors the debris extractor and the rotor wipers while adding shell rigidity and straightening flow through the filter.

Another advantage of the present invention is a simplified shell construction owing to a simplified mounting system for the filter screen. The use of a mounting ring reinforces the filter shell, housing or casing, enhancing shell rigidity, while providing a simplified attachment of the filter screen to the shell.

The screen ribs in a debris filter in accordance with the present invention act as flow straighteners that assist in transporting less turbulent flow through the screen The present invention contemplates a debris filter with a spherical filter screen. A spherical screen offers a more efficient use of space and greater inherent open area.

The present invention is directed to a debris filter

The preferred spherical shape of a debris filter in accordance with the present invention allows for larger bypass openings that in an emergency allow more cooling water through the system should the screen become fully fouled.

DETAILED DESCRIPTION OF THE INVENTION

Figure 1:
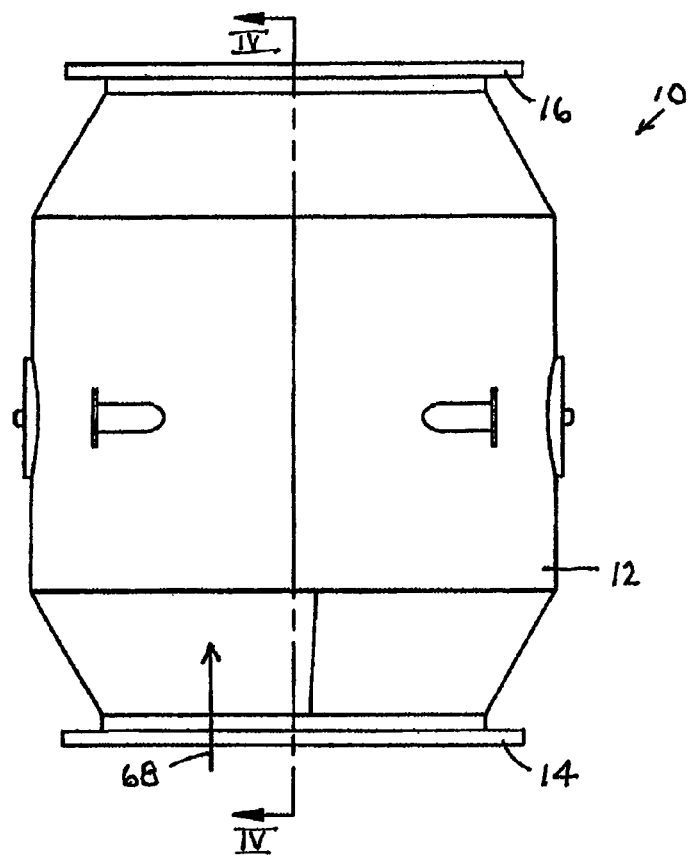
FIG. 1 is a front elevational view of a debris filter in accordance with the present invention.
Figure 2:
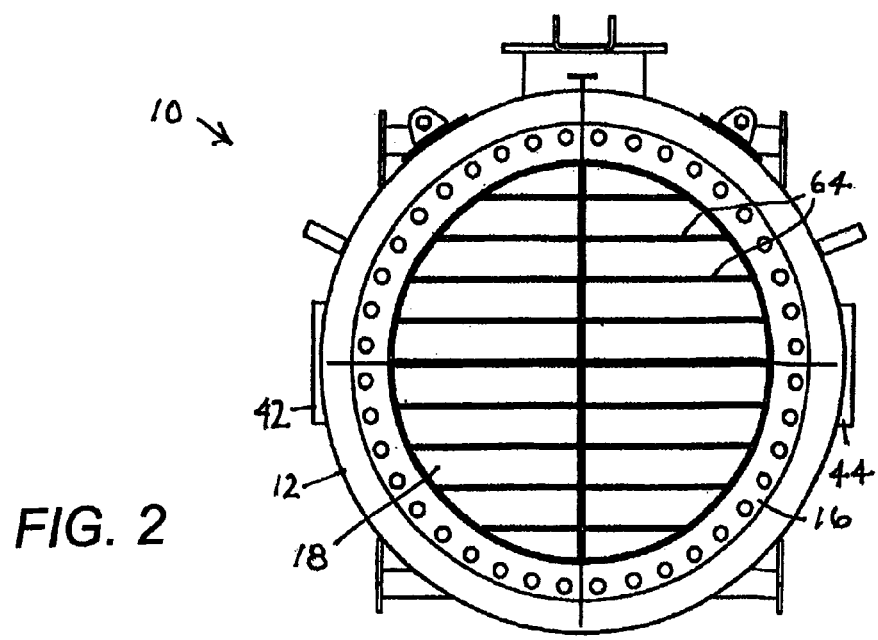
FIG. 2 is a top plan view of the debris filter of FIG. 1.
Figure 3:
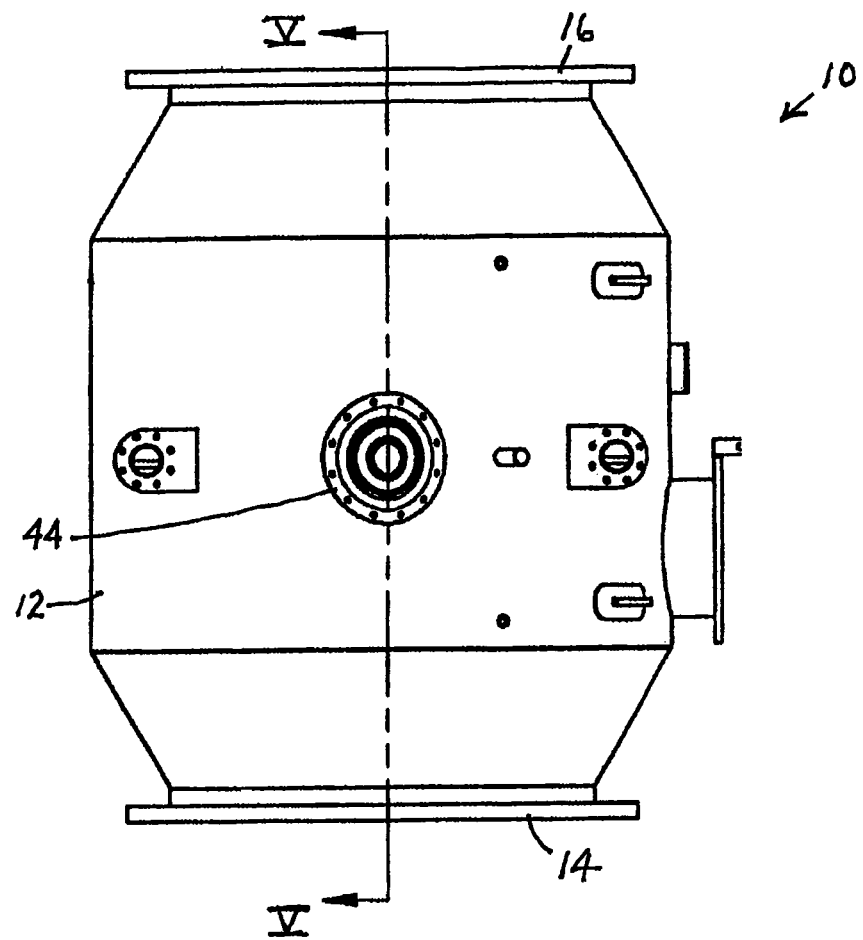
FIG. 3 is a right side elevational view of the debris filter of FIGS. 1 and 2.
Figure 4:
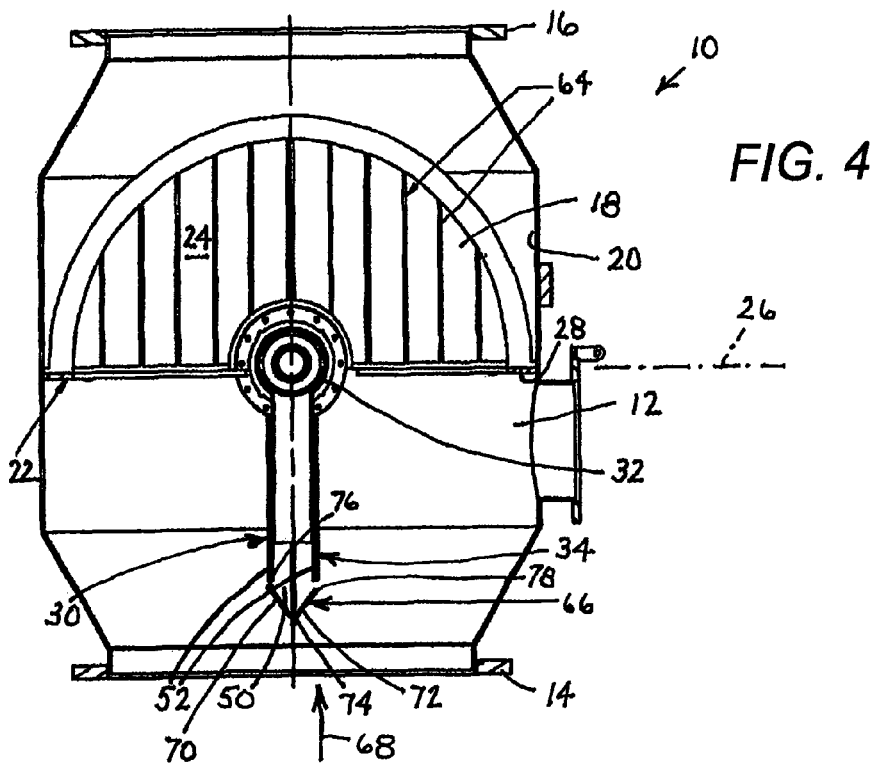
FIG. 4 is a cross-sectional view of the debris filter of FIGS. 1-3, taken along line IV-IV in FIG. 1.

A debris filter 10 comprises a substantially cylindrical housing, shell or casing 12 provided at opposite, conically tapered, ends with an annular inlet flange 14 and an annular outlet flange 16 for coupling the shell or housing to an upstream pipe section (not shown) and a downstream pipe section (not shown), respectively. A spherical filter screen 18, typically made of stainless steel mesh on a stainless steel frame, is mounted to an inner surface 20 of shell or housing 12 via a connector ring 22 (FIGS. 4, 6, 7) welded thereto and extends across a path 68 (FIGS. 1, 4) of fluid flow through the debris filter. Filter screen 18 is concave on an upstream side and defines a filter zone 24 (FIG. 4). Filter zone 24 is at least substantially hemi-spherical and is defined or bounded on an upstream side by a plane 26 defined by a leading circular edge 28 of filter screen 18 or, concomitantly, connector ring 22.

Debris filter 10 further comprises a rotatable debris extractor or screen cleaner 30 for periodically removing debris that accumulates in filter zone 24. Debris extractor 30 includes a cylindrical support member or axle 32, a generally semi-circular suction channel 34, and three tubular mounts 36, 38 and 40 that connect suction channel 34 to support member or axle 32.

Figure 5:
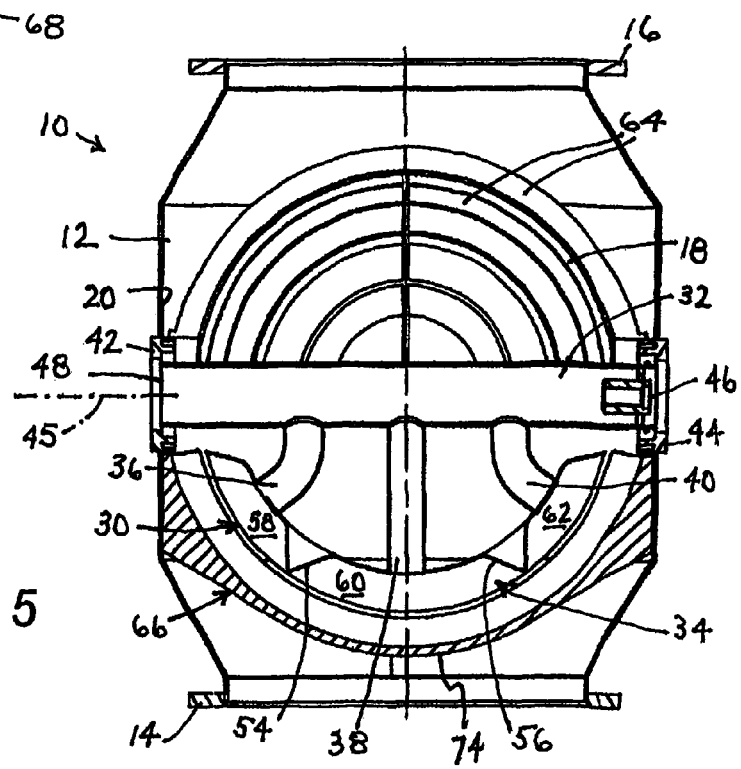
FIG. 5 is a cross-sectional view of the debris filter of FIGS. 1-4, taken along line V-V in FIG. 3.

Support member or axle 32 is mounted to shell or housing 12 via ring bearings 42 and 44 for rotation about an axis 45 (FIG. 5). At one end support member or axle 32 is connected to a rotary drive (not shown) via a coupling 46. An opposite end 48 of support member or axle 32 serves as a debris discharge outlet.

Suction channel 34 has a debris intake opening 50 (FIGS. 4, 6) extending along a cylindrical periphery or outer side of the debris extractor 30. Suction channel 34 has sidewalls 52 (FIGS. 4, 6) that serve as wiper blades.

Suction channel 34 may be formed internally with partitions 54 and 56 (FIGS. 5, 7) that divide the channel into three suction zones 58, 60 and 62 (FIGS. 5, 7) that communicate with support member or axle 32 via tubular mounts 36, 38 and 40, respectively.

Filter screen 18 is provided on its inner or concave side with a plurality of ribs 64 in the form of semi-annular webs. Ribs 64 extend parallel to one another and parallel to rotation axis 45 of debris extractor 30. Thus, ribs or webs 64 extend as annular sections disposed in mutually parallel planes on an inner or upstream side of filter screen 18.

Debris filter 10 further comprises a splitter bar or beam 66 that, like debris extractor 30, extends basically transversely across shell or housing 12 and transversely to path 68 of fluid flow through the debris filter. Splitter bar 66 is firmly secured at opposite ends to inner surface 20 of shell or housing 12. Splitter bar 66 has a chevron-shaped cross-section (see FIGS. 4 and 6) and includes a pair of generally semi-circular legs 70 and 72 in the form of webs connected to one another along a semi-circular apical edge 74 and diverging from one another away from the apical edge. Legs or webs 70 and 72 have respective inner edges 76 and 78 opposite apical edge 74, where the inner web edges 76 and 78 together define a cylindrical or circular inner periphery of splitter bar 66. splitter bar 66 may be alternatively formed with a triangular cross-section (including a third web, not shown, extending between inner edges 76 and 78) or as a solid arcuate wedge.

Figure 6:
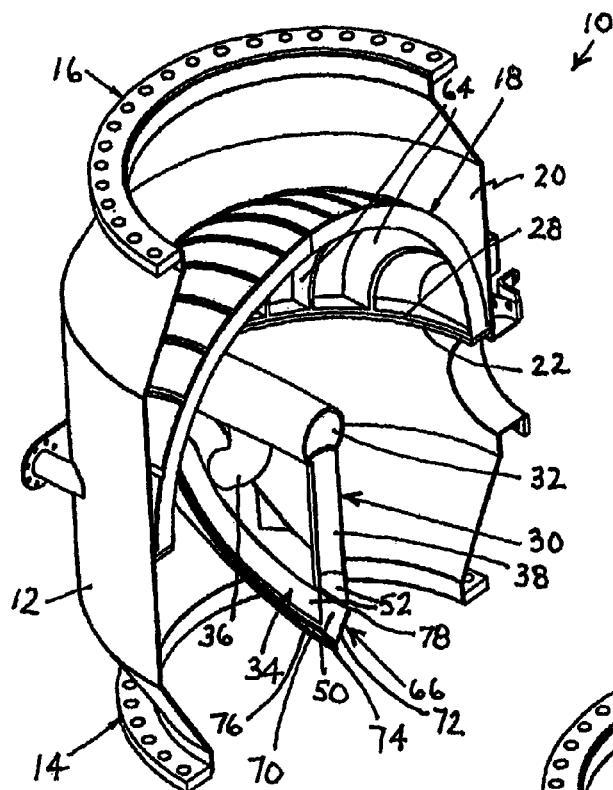
FIG. 6 is an isometric sectional view of the debris filter of FIGS. 1-5, corresponding to the cross-sectional view of FIG. 4.
Figure 7:
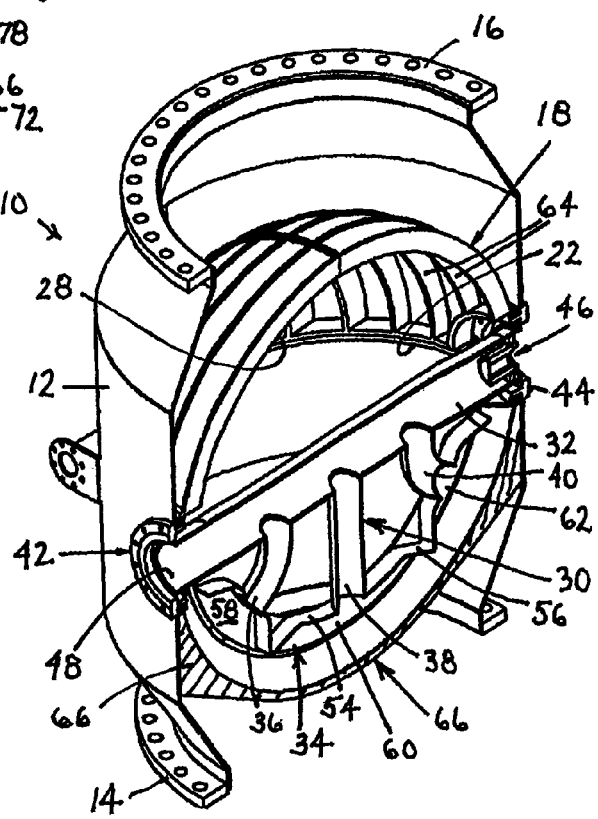
FIG. 7 is an isometric sectional view of the debris filter of FIGS. 1-6, corresponding to the cross-sectional view of FIG. 5.

FIGS. 6-7 depict debris extractor 30 disposed in a parking or rest position. In this rest position, debris extractor is located outside of filter zone 24, away from and upstream of filter screen 18. Debris intake opening 50 is disposed adjacent to the inner periphery of splitter bar 66 and extends parallel thereto owing to, similar cylindrical geometries of intake opening 50 (and the other outer edges of wiper blades 52) and the inner periphery of splitter bar 66. ("Inner periphery" means on the concave side of splitter bar 66 and also on a side closer to axis 45.) Splitter bar 66 thus overlaps intake opening 50 and wiper blades 52, to shield intake opening 50 and wiper blades 52 from passing debris. The angled or tapered form of splitter bar 66 splits incoming fluid flow, diverting the flow around debris extractor 30. Splitter bar 66 may be provided with a profile that is suited for reducing turbulence. Generally, the higher the expected flow rate, the steeper or sharper the profile of splitter bar 66.

When filter zone 24 has accumulated so much debris that the flow rate is impaired, debris extractor 30 is rotated about axis 45 and into zone 24 for cleaning filter screen 18 pursuant to conventional techniques. At the end of the cleaning operation, debris extractor is rotated into the parking or rest position behind or downstream of splitter bar 66, as shown in FIGS. 4-7, Debris filter 10 is used to filter solid particles from liquids, especially for use in steam condensers and heat exchanger in thermal and nuclear power plants. Debris extractor 30 is rotatably driven over the entire surface of filter screen 18 to create a low pressure between suction channel 34 and the filter screen for complete extraction of debris and conveyance thereof out of the debris filter 10 via support member or axle 32.

Splitter bar 66 protects debris extractor 30 and particularly wiper blades 52 thereof from flowing debris. The parking of debris extractor 30 upstream of filter screen 18 and outside of filter zone 24 keeps that zone open. Filter zone 24 is the area of highest speed flow in the pipe system, logically with the highest concentration of debris. Leaving more open flow area in filter zone 24 helps maintain smoother flow and enhanced system performance.

Splitter bar 66 also acts as a flow straightener, thus maintaining a high level of system performance. In addition, splitter bar 66 incidentally serves as a cross-brace to filter shell or housing 12, thereby augmenting shell stiffness.

Spherical filter screen 18 is easier to fabricate and mounting than conventional cylindrical filter screens. In addition, it is easier to rubber line connector ring 22.

Circular or annular connector ring 22 has a beneficial effect of further enhancing the stiffness of shell or housing 12, helping to counteract "hour glassing" during hydro-testing of the unit.

The parking of debris extractor 30 outside of filter zone 24 increases the open area of filter zone 24, allowing for smaller shell diameter—a more compact design reducing fabrication costs and space requirements. The hemi-spherical shape of filter screen 18 more closely follows the natural parabolic flow profile of water. This means that the surface of filter screen 18 is more perpendicular to the flow in areas of greater flow velocity. This results in the most efficient part of filter screen 18 being placed where it is needed the most—in the center of the pipe.

The material of filter screen 18 may be fabricated as "flat" plates as shown or, alternatively, the screen material may be formed in bent ("convoluted") sections similar to the those used in the current half round debris filter design (cylindrical screen cross-section) for even more available open flow area. Either way the screen frame and screening material will form a debris collection "pocket".

It is to be noted that in a debris filter with a spherical filter screen, one may execute the cleaning function by rotating the filter screen relative to the debris extractor, which in this case is held fixed relative to the shell or housing.

It is to be further noted that a spherical screen can be used in both a debris filter as described herein and alternatively modified for operation in the ball strainer function of a tube cleaning system. The current standard strainer design is to use two opposed flat screens that are angled at 20, 25, or 30 degrees relative to the axis of the process pipe. These screens focus the cleaning balls to two points on the outside of the shell for discharge to a remote ball collector. When differential pressure across the screens increases, they are rotated to allow a backwash cycle. The spherical design would allow for the use of screens similarly shaped to the spherical debris filter, but they would be split in the middle and allowed to "clam-shell" for similar backwashing operation. During ball extraction, however, the screens would benefit the system by the ability to focus the balls to a centrally located extraction point in the middle of the process pipe. The centrally located, single discharge point would simplify external piping and reduce the required number of valves, etc. required to pipe the balls to the ball collector. This arrangement would also allow for the use of the system for collection of any particle (coarse, fibrous, hard, soft, rubber/polymer, spherical/non-spherical, etc.) Further, by eliminating the need for side baffles (such as those used in the flat plate design), the spherical screens would aid in minimizing ball loss by reducing gaps and points of turbulence.

Although the invention has been described in terms of particular embodiments and applications, one of ordinary skill in the art, in light of this teaching, can generate additional embodiments and modifications without departing from the spirit of or exceeding the scope of the claimed invention.

For instance, cylindrical support member or axle 32 may be connected to circular suction channel 34 by one or more tubular mounts, depending on the size of the debris filter unit. The number of suction zones 58, 60, & 62 will difference concomitantly. Thus, depending on the number of tubular mounts or connecting arms (36, 38, 40), there will be one (1) or more suction zones (58, 60, 62).

It should be understood that shell or housing 12 can take virtually any form, in addition to the cylindrical body with tapered ends illustrated in the drawings. Other possible configurations include a straight cylindrical section without tapered ends, a cylindrical section flanged on one end and welded on the other, a cylindrical elbow section having the debris filter incorporated into the elbow, and countless other in-line pipe shell configurations.

It is to be further understood that the method of parking a debris extractor frame outside of the filter zone of a debris filter may be used with filter screens other than spherical ones. In a debris filter with a semi-cylindrical screen, the splitter bar has a linear form rather than that of a circular or annular section as in the spherical debris filter illustrated herein. In any case, the debris extractor is parked upstream of the filter zone during normal filter operation, a splitter beam fixed to the filter shell or housing upstream of the parked debris extractor serving to divert incoming fluid away from the debris intake opening of the extractor and smoothly guide the fluid to the filter screen.

Accordingly, it is to be understood that the drawings and descriptions herein are proffered by way of example to facilitate comprehension of the invention and should not be construed to limit the scope thereof.

What is claimed is:

1. A debris filter comprising:
   a housing having an inlet and an outlet defining a flow path through said housing from said inlet to said outlet;
   a filter screen fixedly mounted to said housing and disposed so as to extend across said flow path between said inlet and said outlet;
   a debris extractor rotatably mounted to said housing upstream of said filter screen for rotation about an axis relative to said housing and said filter screen, said debris extractor having a debris intake opening; and
   a splitter bar secured to said housing upstream of said filter screen,
   said debris extractor and said splitter bar having at least partially similar geometrical shapes so that rotation of said debris extractor can position said intake opening in juxtaposition with or adjacent to said splitter bar and in parallel relation thereto with said splitter bar overlapping and shielding said intake opening.

2. The debris filter defined in claim 1 wherein said filter screen is spherical and said intake opening extends along a cylindrical or circular periphery of said debris extractor, said splitter bar having a cylindrical or circular inner periphery juxtaposable to said intake opening.

3. The debris filter defined in claim 2 wherein said splitter bar has a tapered or wedge-shaped form.

4. The debris filter defined in claim 3 wherein said splitter bar has a chevron-shaped cross-section.

5. The debris filter defined in claim 4 wherein said splitter bar includes a pair of legs in the form of webs connected to one another along an apical edge and diverging from one another away from said edge, said webs having respective edges opposite said apical edge, said respective edges defining said cylindrical or circular inner periphery of said splitter bar.

6. The debris filter defined in claim 2 wherein said filter screen is mounted to said housing via a connector ring fixed to an inner surface of said housing.

7. The debris filter defined in claim 1 wherein said debris extractor is mounted to said housing for rotation about an axis oriented transversely to said path of fluid flow through said housing, said filter screen and said splitter bar being fixed relative to said housing.

8. The debris filter defined in claim 7 wherein said debris extractor is mounted to said housing upstream of an annular upstream edge of said filter screen.

9. The debris filter defined in claim 1 wherein said filter screen defines a filter zone, said debris extractor being positionable upstream of said filter screen and outside of said filter zone when said intake opening is disposed adjacent said splitter bar.

10. The debris filter defined in claim 1 wherein said splitter bar extends across said flow path through said housing, upstream of said filter screen.

11. The debris filter defined in claim 1 wherein said debris extractor includes a plurality of wiper blades disposed alongside said intake opening, said splitter bar being so mounted to said housing that said intake opening is positionable adjacent said splitter bar with said splitter bar overlapping and shielding said wiper blades.

12. The debris filter defined in claim 1 wherein said filter screen is provided with a plurality of ribs, said ribs being elongate webs extending as annular sections disposed in mutually parallel planes on an inner or upstream side of said filter screen.

13. The debris filter defined in claim 1 wherein said filter screen is concave and defines a filter zone on an upstream side, said filter zone being bounded by a plane on an upstream side, said debris extractor having a rest position on a side of said plane opposite said filter screen, so that in said rest position said debris extractor is disposed outside of said filter zone.

14. The debris filter defined in claim 1 wherein said splitter bar has an upstream surface, facing away from said filter screen, said upstream surface having a wedge or chevron shape with legs at an angle selected in accordance with a rate of flow through said debris filter, to reduce turbulence around said debris intake opening of said debris extractor and concomitantly to reduce turbulence entering said filter zone.

15. The debris filter defined in claim 1 wherein said splitter bar has a tapered or wedge-shaped form.

16. The debris filter defined in claim 1 wherein said splitter bar has a chevron-shaped cross-section.

17. The debris filter defined in claim 1 wherein said splitter bar includes a pair of legs in the form of webs connected to one another along an apical edge and diverging from one another away from said edge, said webs having respective edges opposite said apical edge, said respective edges defining said cylindrical or circular inner periphery of said splitter bar.

18. The debris filter defined in claim 1 wherein said filter screen is mounted to said housing via a connector ring fixed to an inner surface of said housing.

* * * * *